United States Patent
Todd et al.

(10) Patent No.: US 10,789,224 B1
(45) Date of Patent: Sep. 29, 2020

(54) DATA VALUE STRUCTURES

(71) Applicant: EMC Corporation, Hopkinton, MA (US)

(72) Inventors: Stephen Todd, Shrewsbury, MA (US); Oshry Ben-Harush, Beer-Sheva (IL); Brahma Tangella, Brighton, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 854 days.

(21) Appl. No.: 15/135,817

(22) Filed: Apr. 22, 2016

(51) Int. Cl.
*G06F 16/00* (2019.01)
*G06F 16/215* (2019.01)

(52) U.S. Cl.
CPC .................... *G06F 16/215* (2019.01)

(58) Field of Classification Search
CPC ........... G06F 17/30303; G06F 17/3012; G06F 17/30592; G06F 16/2455; G06F 16/2379; G06F 16/20; G06F 16/2246; G06F 16/3331; G06F 16/90335; G06F 16/215; G06Q 30/0206
USPC ....................................................... 707/689
See application file for complete search history.

(56) References Cited

U.S. PATENT DOCUMENTS

| | | |
|---|---|---|
| 6,715,145 B1 | 3/2004 | Bowman-Amuah |
| 6,957,227 B2 | 10/2005 | Fogel et al. |
| 7,574,426 B1 | 8/2009 | Ortega |
| 7,580,848 B2 | 8/2009 | Eder |
| 7,752,195 B1 | 7/2010 | Hohwald et al. |
| 7,890,451 B2 | 2/2011 | Cancel et al. |
| 7,970,729 B2 | 6/2011 | Cozzi |
| 8,423,500 B1 * | 4/2013 | Adams .............. G06N 3/02 706/55 |
| 8,561,012 B1 | 10/2013 | Holler et al. |
| 8,832,013 B1 * | 9/2014 | Adams .............. G06N 5/02 706/46 |
| 9,262,451 B1 | 2/2016 | Singh et al. |
| 9,384,226 B1 | 7/2016 | Goel et al. |
| 9,465,825 B2 | 10/2016 | Nelke et al. |
| 9,606,828 B2 | 3/2017 | Ghosh et al. |
| 9,619,550 B1 * | 4/2017 | Todd .............. G06F 16/25 |
| 9,851,997 B2 | 12/2017 | Gough et al. |
| 10,122,806 B1 * | 11/2018 | Florissi .............. H04L 67/22 |
| 2001/0042062 A1 | 11/2001 | Tenev et al. |

(Continued)

OTHER PUBLICATIONS

U.S. Appl. No. 14/863,783 filed in the name of Stephen Todd et al. filed Sep. 24, 2015 and entitled "Unstructured Data Valuation."

(Continued)

*Primary Examiner* — Thanh-Ha Dang
(74) *Attorney, Agent, or Firm* — Ryan, Mason & Lewis, LLP (57) ABSTRACT

At least part of an analytic process is executed on one or more data sets. Execution of the analytic process is performed within an analytic computing environment. During the course of execution of the analytic process, a data structure is generated comprising data structure elements. The data structure elements represent attributes associated with execution of the analytic process. Value is assigned to at least a portion of the data structure elements. The data structure generated during execution of the analytic process may be stored in an accessible catalog of other data structures generated during execution of other analytic processes.

20 Claims, 5 Drawing Sheets

(56) References Cited

U.S. PATENT DOCUMENTS

| | | | |
|---|---|---|---|
| 2003/0167265 A1* | 9/2003 | Corynen | G06Q 10/04 |
| 2004/0122646 A1* | 6/2004 | Colossi | G06F 16/283 |
| | | | 703/22 |
| 2005/0182739 A1 | 8/2005 | Dasu et al. | |
| 2007/0005383 A1 | 1/2007 | Kasower | |
| 2009/0018996 A1* | 1/2009 | Hunt | G06F 16/2264 |
| 2009/0282089 A1 | 11/2009 | Lakshmanachar et al. | |
| 2009/0327921 A1 | 12/2009 | Holm-Peterson et al. | |
| 2010/0094685 A1 | 4/2010 | Young | |
| 2010/0153324 A1 | 6/2010 | Downs et al. | |
| 2011/0055699 A1 | 3/2011 | Li et al. | |
| 2011/0078603 A1 | 3/2011 | Koomullil | |
| 2012/0084261 A1 | 4/2012 | Parab | |
| 2012/0116911 A1 | 5/2012 | Irving et al. | |
| 2012/0123994 A1* | 5/2012 | Lowry | G06Q 40/00 |
| | | | 706/52 |
| 2012/0310684 A1 | 12/2012 | Carter | |
| 2012/0323843 A1* | 12/2012 | Bice | G06F 17/30303 |
| | | | 707/609 |
| 2013/0036091 A1 | 2/2013 | Provenzano et al. | |
| 2013/0055042 A1 | 2/2013 | Al Za'noun et al. | |
| 2013/0073594 A1 | 3/2013 | Jugulum et al. | |
| 2013/0110842 A1 | 5/2013 | Donneau-Golencer et al. | |
| 2013/0151423 A1 | 6/2013 | Schmidt et al. | |
| 2014/0046983 A1* | 2/2014 | Galloway | G06F 16/29 |
| | | | 707/798 |
| 2014/0052489 A1 | 2/2014 | Prieto | |
| 2014/0324856 A1 | 10/2014 | Lahiani et al. | |
| 2015/0120555 A1 | 4/2015 | Jung et al. | |
| 2015/0134386 A1* | 5/2015 | Jogalekar | G06Q 10/06311 |
| | | | 705/7.13 |
| 2015/0134591 A1 | 5/2015 | Staeben et al. | |
| 2015/0293974 A1 | 10/2015 | Loo | |
| 2016/0055184 A1 | 2/2016 | Fokoue-Nkoutche et al. | |
| 2016/0110819 A1 | 4/2016 | Abramowitz | |
| 2016/0196311 A1 | 7/2016 | Wang et al. | |
| 2016/0224430 A1 | 8/2016 | Long et al. | |
| 2017/0236060 A1 | 8/2017 | Ignatyev | |
| 2017/0293655 A1 | 10/2017 | Ananthanarayanan et al. | |

OTHER PUBLICATIONS

U.S. Appl. No. 14/998,112 filed in the name of Stephen Todd et al. filed Dec. 24, 2015 and entitled "Data Valuation Based on Development and Deployment Velocity."

U.S. Appl. No. 14/973,096 filed in the name of Stephen Todd et al. filed Dec. 17, 2015 and entitled "Data Set Valuation for Service Providers."

U.S. Appl. No. 14/973,141 filed in the name of Stephen Todd et al. filed Dec. 17, 2015 and entitled "Automated Data Set Valuation and Protection."

U.S. Appl. No. 14/973,178 filed in the name of Stephen Todd filed Dec. 17, 2015 and entitled "Timeliness Metrics and Data Valuation in Distributed Storage Systems."

U.S. Appl. No. 15/073,741 filed in the name of Stephen Todd et al. filed Mar. 18, 2016 and entitled "Data Quality Computation for Use in Data Set Valuation."

U.S. Appl. No. 15/072,557 filed in the name of Stephen Todd et al. filed Mar. 17, 2016 and entitled "Metadata-Based Data Valuation."

U.S. Appl. No. 15/136,327 filed in the name of Stephen Todd et al. filed Apr. 22, 2016 and entitled "Calculating Data Value via Data Protection Analytics."

U.S. Appl. No. 15/135,790 filed in the name of Stephen Todd et al. filed Apr. 22, 2016 and entitled "Data Valuation at Content Ingest."

U.S. Appl. No. 13/923,791 filed in the name of Stephen Todd et al. filed Jun. 21, 2013 and entitled "Data Analytics Computing Resource Provisioning."

U.S. Appl. No. 14/744,886 filed in the name of Marina Zeldin et al. filed Jun. 19, 2015 and entitled "Infrastructure Trust Index."

Wikipedia, "Value Chain," https://en.wikipedia.org/w/index.php?title=Value_chain&printable=yes, Jun. 6, 2016, 7 pages.

Doug Laney, "The Economics of Information Assets," The Center for Infonomics, http://www.smarter-companies.com/group/icpractitioners/forum/topics/abstract-and-slides-for-today-s-session-on-infonomics-by-doug, Sep. 13, 2011, 22 pages.

Nicole Laskowski, "Six Ways to Measure the Value of Your Information Assets," Tech Target, http://searchcio.techtarget.com/feature/Six-ways-to-measure-the-value-of-your-information-assets?vgnextfmt=print, May 8, 2014, 3 pages.

R. Shumway et al., "White Paper: Infonomics in Practice: Realizing the True Value of Business Data," Cicero Group, http://cicerogroup.com/app/uploads/2015/09/Infonomics-in-Practice.pdf, 2015, 4 pages.

E. Kupiainen et al., "Why Are Industrial Agile Teams Using Metrics and How Do They Use Them?" Proceedings of the 5th International Workshop on Emerging Trends in Software Metrics, Jun. 2014, 7 pages.

D. Hartmann et al., "Appropriate Agile Measurement: Using Metrics and Diagnostics to Deliver Business Value," Proceedings of the Conference on Agile, Jul. 2006, 6 pages.

T. Lehtonen et al., "Defining Metrics for Continuous Delivery and Deployment Pipeline," Proceedings of the 14th Symposium on Programming Languages and Software Tools, Oct. 2015, 16 pages.

* cited by examiner

DATA VALUE STRUCTURES

FIELD

The field relates generally to data processing and, more particularly, to valuation associated with data analytics processes.

BACKGROUND

Data analytics, or analytical processes performed on data sets, have become important tools for business entities, e.g., a company that handles large amounts of data during the course of business. As a result, careful consideration of the data analytic life cycle has become common in the industry because of the insight that massive amounts of data can bring. Companies are making large investments in data, data scientists, and analytics tools. Data analytic activities often end with a recommendation providing some sort of value (e.g., revenue or cost savings) to a company.

SUMMARY

Embodiments of the invention provide techniques for valuation associated with data analytics processes.

For example, in one embodiment, a method comprises the following steps. At least part of an analytic process is executed on one or more data sets. Execution of the analytic process is performed within an analytic computing environment. During the course of execution of the analytic process, a data structure is generated comprising data structure elements. The data structure elements represent attributes associated with execution of the analytic process. Value is assigned to at least a portion of the data structure elements. The data structure generated during execution of the analytic process may be stored in an accessible catalog of one or more other data structures generated during execution of one or more other analytic processes.

Advantageously, in accordance with illustrative embodiments, the above-described data structure provides a mechanism for value association in the context of execution of a data science experiment (i.e., analytic process) that can provide many benefits in the form of revenue and cost savings to a company.

These and other features and advantages of the invention will become more readily apparent from the accompanying drawings and the following detailed description.

DETAILED DESCRIPTION

Illustrative embodiments may be described herein with reference to exemplary cloud infrastructure, data repositories, data centers, data processing systems, computing systems, data storage systems and associated servers, computers, storage units and devices and other processing devices. It is to be appreciated, however, that embodiments of the invention are not restricted to use with the particular illustrative system and device configurations shown. Moreover, the phrases "cloud infrastructure," "data repository," "data center," "data processing system," "computing system," "data storage system," "data lake," and the like as used herein are intended to be broadly construed, so as to encompass, for example, private and/or public cloud computing or storage systems, as well as other types of systems comprising distributed virtual infrastructure. However, a given embodiment may more generally comprise any arrangement of one or more processing devices.

As used herein, the following terms and phrases have the following illustrative meanings:

"metadata" illustratively refers to data that describes or defines data;

"valuation" illustratively refers to a computation and/or estimation of something's worth or value for a given context;

"context" illustratively refers to time, place, surroundings, circumstances, environment, background, settings, and/or the like, that determine, specify, and/or clarify something;

"node" illustratively refers to a data structure element with which an input to an analytic process, a result of execution of an analytic process, or an output from an analytic process is associated, along with metadata if any, examples of nodes include, but are not limited to, structured database nodes, graphical nodes, and the like;

"connector" illustratively refers to a data structure element which connects nodes in the data structure, and with which transformations or actions performed as part of the analytic process are associated, along with metadata if any; examples of connectors include, but are not limited to, arcs, pointers, links, etc. (while illustrative examples herein refer to connectors as arcs, it is understood that embodiments of the invention are not so limited);

"analytic sandbox" illustratively refers to at least a part of an analytic computing environment (including specifically allocated processing and storage resources) in which one or more analytic processes are executed on one or more data sets; for example, the analytic process can be part of a data science experiment and can be under the control of a data scientist, an analytic system, or some combination thereof.

It is realized herein that companies make large investments in data, data scientists, and tools, and currently have no mechanism to measure the value or return on investment for these data science efforts and to the company overall. For example, immediately after a data science experiment (i.e., an analytic process) is performed, a potential value is typically presented to the business. If the business adopts the proposed solution, an actual value can be harvested following implementation. It would be desirable to be able to measure the value of data (for both potential and actual value) and determine which tools and which data scientists predicted results closest to the actual results.

Assume that a data science experiment leads to a result (e.g., $30M in cost savings for some aspect of a business) that is summarized and reported to the business. Keeping every data set involved in the analysis may not be allowed (e.g., due to retention/deletion policies) or cost-effective (e.g., due to the impracticality of perhaps thousands of data analytic sandboxes holding on to stale data). However, it is realized herein that the deletion of these data sets can cause the loss of the provenance that led to the final result.

It is further realized herein that top level recommendations coming from data science experiments are often operationalized in order to capture the value predicted by the recommendation. Once the operationalization is deployed and the business value is realized (or perhaps not realized), there is often no existing way to recall the specific data science steps that were taken and associate the "actual value" along with the "predicted value." The knowledge of both of these numbers would be valuable to assess the tools, people, and data that were used in the original analysis.

From the moment a predicted or actual value is associated with a data science result, there is no existing way to immediately associate or distribute that value amongst the contributing sources (e.g., data, people, tools, etc.) that helped to generate that value. Further, as attempts may be made to cascade a value of an analytic result to the contributing sources of the analytic result, there is no existing way to correlate the value to other data science projects that may also be using overlapping data sets, people, and/or tools. There also is currently no way to enumerate all of the tools used for analytics and associate them with the value that each tool has generated. If a given data set is processed by two different tools, there is no existing way to evaluate the value generated by one tool versus the other tool.

Still further, for each tool used in the analytic process, there is no existing way to discover the people that use that tool the most, or the value that each person tends to generate using that tool. There is also no existing way to correlate the value that a data scientist generates within a specific data science project or in aggregate across many projects. Also, there is no existing way to associate a data scientist with the type of data he/she tends to work on and the type of data from which he/she generates the most value. There are also no existing tools that can display (e.g., graphical or command line) the full catalog of data science experiments, their contributing people, data, and tools, from a value point of view.

Embodiments of the invention overcome the above and other drawbacks by providing the above-mentioned functionalities and advantages that are lacking in existing data analytic systems and approaches. In accordance with illustrative embodiments, a data structure in the form of a data value tree is created and populated as a data science experiment (i.e., analytic process) is being conducted on one or more data sets. The creation of the data value tree can be integrated with one or more other valuation frameworks that have been deployed and are associated with the one or more data sets. In one example, a data value tree can be constructed in an analytic sandbox that is coupled to a data lake architecture. This data lake architecture may itself have a valuation framework that tracks the value of data (and metadata) in the data lake. The data value tree can be stored in a data value tree catalog (archive) with one or more other data value trees generated for other data science experiments. Such a catalog can be queried to access each data value tree stored in the catalog.

Figure 1:
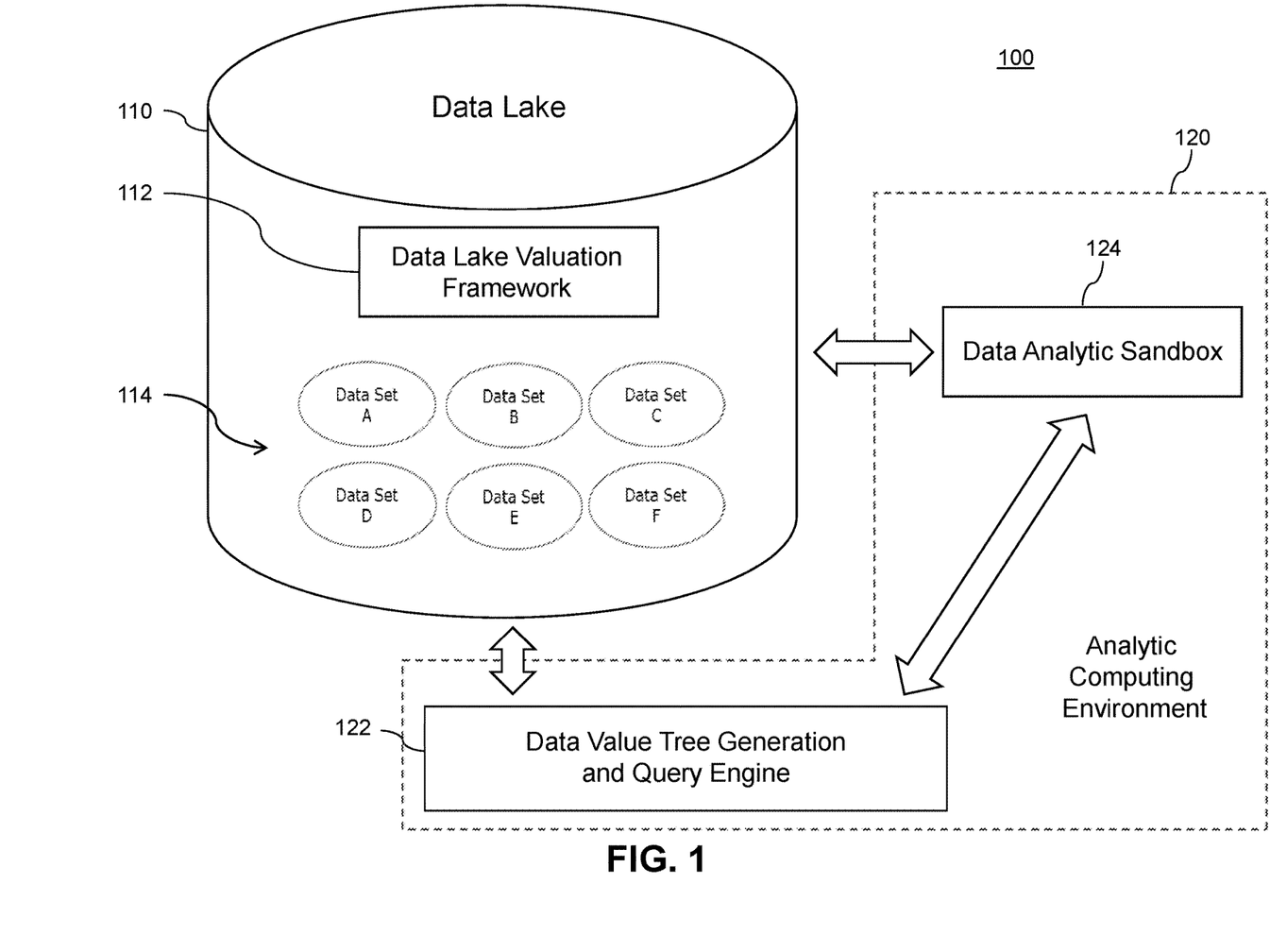
FIG. 1 illustrates a data value tree generation and query engine and its corresponding environment, according to an embodiment of the invention.

FIG. 1 illustrates a data value tree generation and query engine and its corresponding environment 100, according to an embodiment of the invention. As shown, environment 100 comprises a data lake 110 which comprises a data lake valuation framework 112 and a plurality of data sets 114 (e.g., data sets A, B, C, D, E, and F). Also shown is analytic computing environment 120 which comprises data value tree generation and query engine 122 coupled to data analytic sandbox 124. The components of the analytic computing environment 120 are coupled to the components of the data lake 110. While components of the analytic computing environment 120 are shown separate from components of the data lake 110, it is to be appreciated that some or all of the components can be implemented together.

The analytic computing environment 120 is configured to execute an analytic process (e.g., a data science experiment) on one or more of the plurality of data sets 114 within the data analytic sandbox 124.

The data analytic sandbox 124 can be used to condition and experiment with the data and preferably has: (i) large bandwidth and sufficient network connections; (ii) a sufficient amount of data capacity for data sets including, but not limited to, summary data, structured/unstructured, raw data feeds, call logs, web logs, etc.; and (iii) transformations needed to assess data quality and derive statistically useful measures. Regarding transformations, it is preferred that data is transformed after it is obtained, i.e., ELT (Extract, Load, Transform), as opposed to ETL (Extract, Transform, Load). However, the transformation paradigm can be ETLT (Extract, Transform, Load, Transform again), in order to attempt to encapsulate both approaches of ELT and ETL. In either the ELT or ETLT case, this allows analysts to choose to transform the data (to obtain conditioned data) or use the data in its raw form (the original data). Examples of transformation tools that can be available as part of the data analytic sandbox 124 include, but are not limited to, Hadoop™ (Apache Software Foundation) for analysis, Alpine Miner™ (Alpine Data Labs) for creating analytic workflows, and R transformations for many general purpose data transformations. Of course, a variety of other tools may be part of the data analytic sandbox 124.

The data value tree generation and query engine 122 is configured to generate, during the course of execution of the analytic process in the analytic sandbox 124, a data value tree (i.e., data structure) comprising data value tree elements, wherein the data value tree elements represent attributes associated with execution of the analytic process. In the examples to follow, the data value tree elements comprise nodes and arcs connecting the nodes. An example of a data value tree will be described below in the context of FIG. 2. The engine 122 also assigns value to at least a portion of the data value tree elements (e.g., the nodes and/or arcs). Assignment of value can occur in conjunction with data lake valuation framework 112. That is, previously calculated values associated with the data sets 114 can be used by the engine 122 to assign value to the elements of the data value tree. However, values may be independently calculated by the engine 122.

It is to be appreciated that the creation of a data value tree can also occur in the analytic sandbox 124, as well as other places, e.g., within the data lake, in the location where it is ultimately archived, or any other appropriate place.

Figure 2:
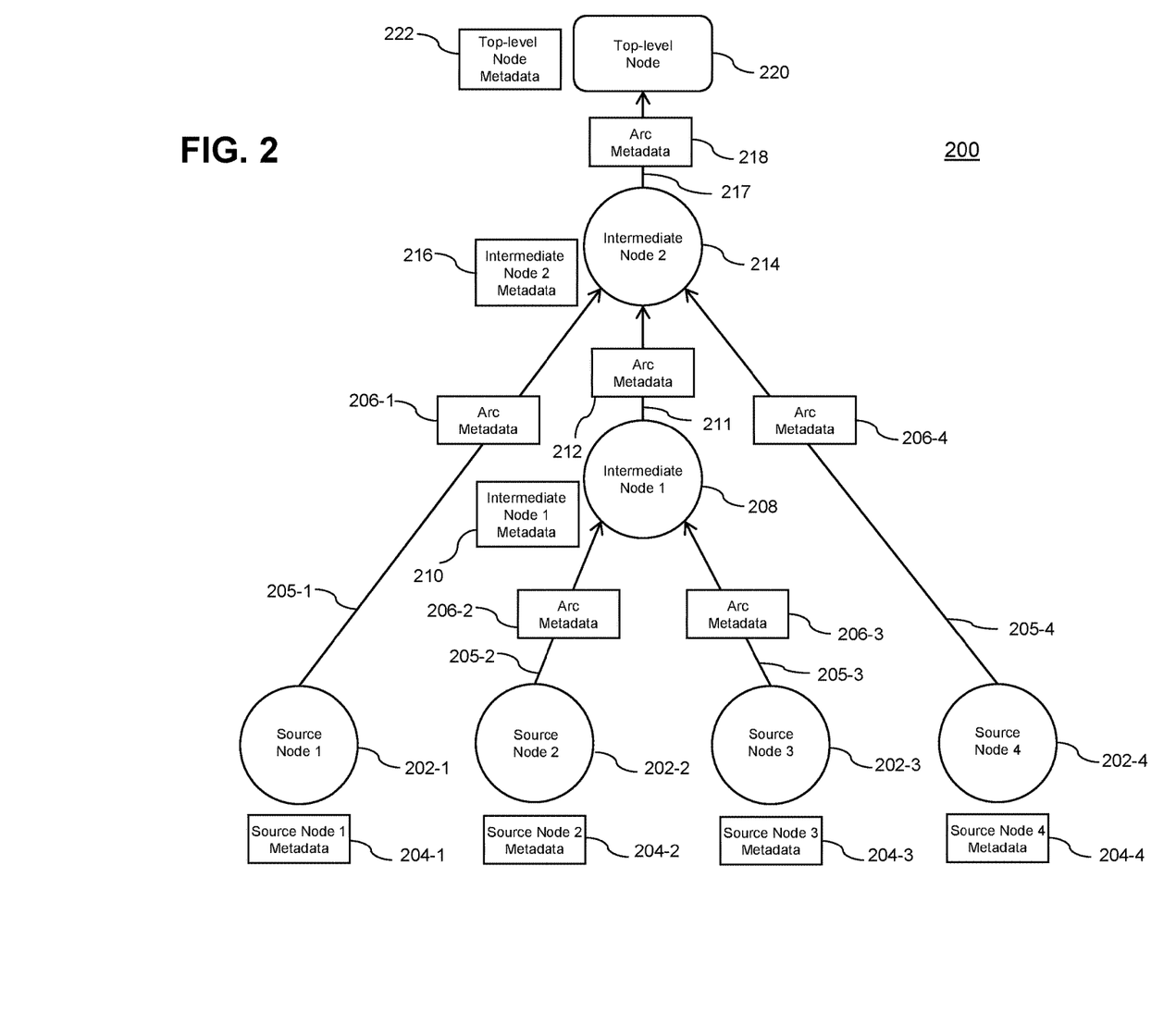
FIG. 2 illustrates an example of a data value tree, according to an embodiment of the invention.

FIG. 2 illustrates an example of a data value tree, according to an embodiment of the invention. As shown, data value tree 200 comprises multiple nodes connected by multiple arcs, with metadata associated with each node and each arc. Note that the number of nodes and arcs shown in FIG. 2 are intended to be examples, and a data value tree can therefore have more or less elements. Nodes, in this example, comprise source nodes 202-1 through 202-4 (the source nodes respectively having metadata 204-1 through 204-4 associated therewith), intermediate nodes 208 and 214 (the intermediate nodes respectively having metadata 210 and 216 associated therewith), and a top-level (or end-level) node 220 (the top-level node having metadata 222 associated therewith).

As further shown in FIG. 2, the various nodes are connected via arcs (i.e., connectors). Arcs 205-1 and 205-4 connect source nodes 202-1 and 202-4 to intermediate node 214 (the arcs respectively having metadata 206-1 and 206-4 associated therewith). Arcs 205-2 and 205-3 connect source nodes 202-2 and 202-3 to intermediate node 208 (the arcs respectively having metadata 206-2 and 206-3 associated therewith). Arc 211 connects intermediate node 208 with intermediate node 214 (the arc having metadata 212 associated therewith). Arc 217 connects intermediate node 214 with top-level node 220 (the arc having metadata 218 associated therewith).

It is to be appreciated that the phrase "associated with" in this context means that data and/or metadata (e.g., descriptive metadata, values, or other types of metadata) is stored within the data structure of the data value tree in such a manner that when a node or arc is queried or otherwise accessed, the data and/or metadata for the node or arc is read or written to. A database structure, a graphical structure, or another functionally similar structure can be employed to realize the data structure. It is also to be appreciated that data and/or metadata mentioned herein as being associated with a given node can alternatively be associated with a corresponding, connecting arc, and vice versa.

In one use case example, assume the data value tree is being generated for some business purpose. Assume further that the bottom level nodes (source nodes 202-1 through 202-4) in the data value tree 200 contain descriptive metadata (204-1 through 204-4) about four original data sources, and the arcs (205-1 through 205-4) connected to the nodes represent transforms conducted on the data sources by data scientists. Metadata (206-1 through 206-4) about the data scientist, the transform tools used, and/or the nature of the work is associated with the arcs in the data value tree. These arcs lead to intermediate results (208 and 214) that likewise contain descriptive metadata (210 and 216) about the intermediate results. Further transforms are applied to the intermediate results and represented by arcs (211 and 217) and respectively described by metadata (212 and 218). The data value tree eventually is topped by a report (node 220 and metadata 222) that contains a recommendation to help the business. In one example, a recommendation is generated at this top-level node that results in a potentially significant monetary savings to the business. The projected savings are potentially achievable by operationally implementing the recommendation described in the top-level node. The recommendation may likely involve incorporating certain process changes and/or new processes within the business. As described herein, after the recommendation is implemented by the business, actual cost savings will then be known, and the data value tree can then be updated with the actual values. The actual values of each contributing data set (node) that yielded the recommendation can then be determined from the updated tree. This information can then be used by the business in many ways, as will be further illustrated in descriptions below. Further illustrative details of data value tree generation will now be given.

The building of a data value tree 200 in analytic sandbox 124 involves a variety of activities including, for example as mentioned above, ELT activity into the analytic sandbox. As each data set flows into the analytic sandbox, any valuation metadata currently being tracked by the larger data lake 110 can flow into the data value tree (and be stored as metadata). Similarly, as the data value tree is being built and modified in the analytic sandbox, the data value tree can communicate metadata and results back into a larger valuation framework such as framework 112. If there is no larger valuation framework available, the data value tree can be built in isolation.

Once all data sources have been obtained by the analytic sandbox 124, the data scientist begins generating intermediate data sets using one or more source inputs and one or more toolsets. Once these intermediate data sets have been generated completely, for example, the stage is marked via the addition of an intermediate node in the data value tree, and an arc is created attaching this new node to any of the data sources involved in its creation. The intermediate node stores metadata related to its contents (e.g., the tables or keywords common in the intermediate data set). Timestamps and other system metadata can also be stored. The storage of nodes (and arcs) can be accomplished using any number of repositories, including structured databases and/or graph packages.

Furthermore, as a data value tree is being built, the cardinality (i.e., number of arcs emanating from a node) can be calculated and used in subsequent valuation algorithms. A data scoring methodology can be employed to store the score at each of the corresponding nodes based on the number of arcs that are connected.

Still further, when a value is assigned to a node in the data value tree, it can be added to the tree along with a valuation algorithm that will run down from the top node and assign value to each piece of data visited on the way. This approach allows for immediate in-line valuation to occur during the building of a data value tree. Examples of algorithms that can be executed include, but are not limited to: round robin distribution of value; neural net techniques (e.g., backpropagation); call-outs to a data lake valuation framework; value based on tool(s) used; value based on scientist(s) involved; or any combination of the above.

Figure 3:
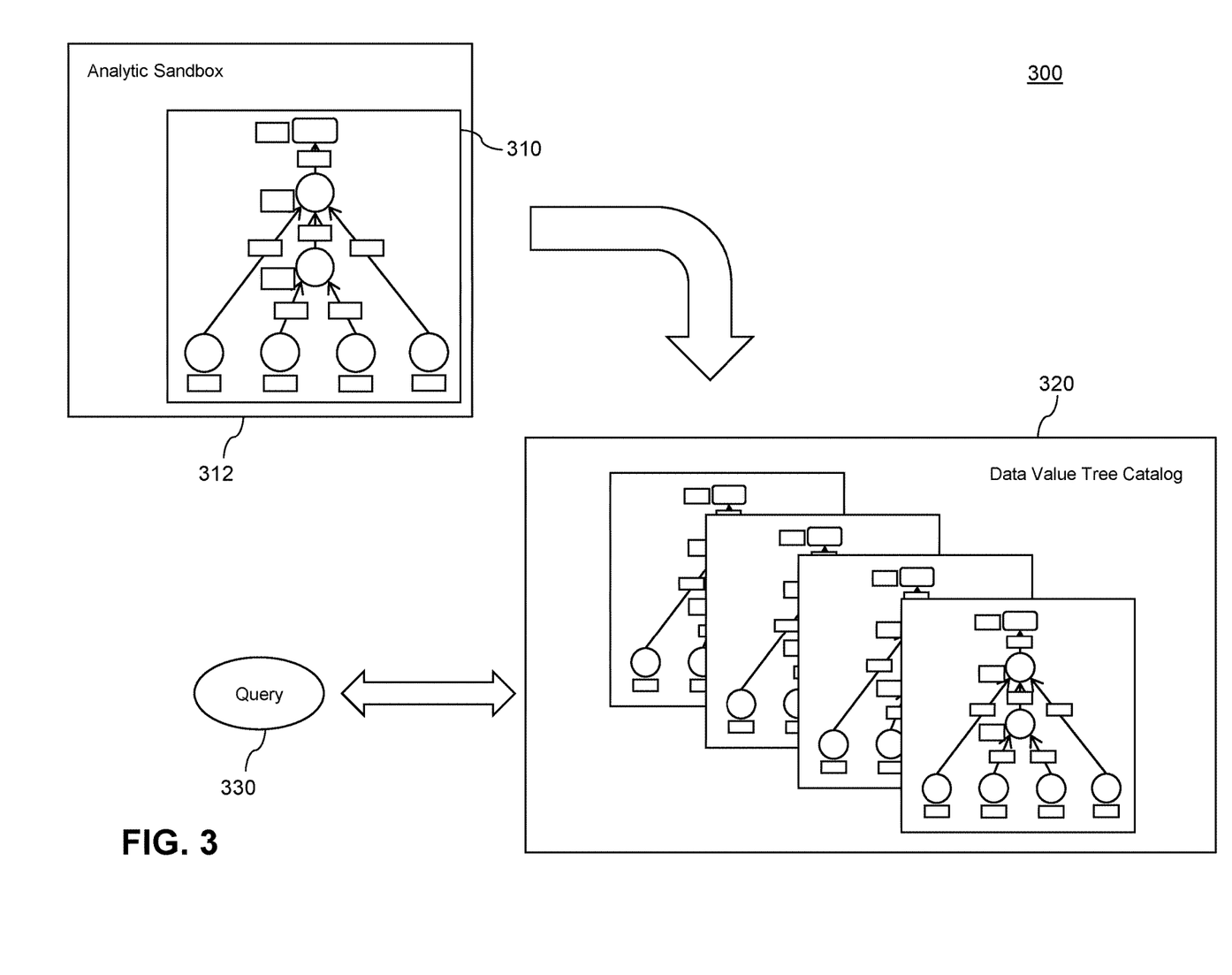
FIG. 3 illustrates a methodology for storing and querying data value trees, according to an embodiment of the invention.

FIG. 3 illustrates a methodology for storing and querying data value trees, according to an embodiment of the invention. As shown in methodology 300, a data value tree 310 is generated in analytic sandbox 312, as described herein. The data value tree 310 is stored in a data value tree catalog 320 with one or more other data value trees generated in accordance with the execution of one or more other data analytic processes (other data science experiments). Each data value tree stored in catalog 320 can be queried. A query 330 may include a read instruction (e.g., obtain data from a data value tree), a write instruction (e.g., update a data value tree), and/or some other instruction. The query 330 can also be part of an audit process. It is to be understood that data value trees can also be queried on their own, whether or not they exist in a catalog.

Data value trees can be stored in any number of ways including, but not limited to, immutable content stores (e.g., Centera storage system). A data value tree can also be stored with a final report or recommendation generated by the data analytic process for which the tree was built, as mentioned above. A data value tree can also be stored on an object-based system, return an object identifier (ID), and that object could be permanently bound to the analytic recommendation as part of its permanent metadata. The data value tree catalog 320 can track, for example, every data science project being conducted in a data lake (110 in FIG. 1). Furthermore, the catalog 320 can be stored in data lake 110, analytic computing environment 120, or some combination thereof.

The data value tree stores a minimal amount of data per analytic project and persists even when the data and/or the analytic sandbox is destroyed. In addition, the data value tree catalog contains a history of the scientists and the tools involved and closely associates them with the data.

Further, the data value tree serves as a snapshot image of the high level business value of the overall experiment, the data sources involved, and the perceived value of all of those contributing data sources at the time that the prediction was made.

Still further, the data value tree catalog (or archive) allows a lookup function for any given data value tree. If a particular data science project resulted in an operationalized recommendation, the tree associated with that recommendation can be fetched from the catalog and loaded into memory. The actual value can then be attached to the top-level node (the original predicted value can still be saved). When the actual value is loaded, the data value tree can likewise provide valuation algorithms that can propagate actual value to contributing nodes. This new data value tree can be contributed back into the catalog, either as a replacement data value tree or a versioned data value tree. Furthermore, data value trees can be modified directly in the catalog if necessary. A report can be associated with the data value tree (e.g., plan post-mortem analysis on how the recommendations were executed).

The process of adding actual value to the data value tree can trigger a series of dynamic actions. For example:

Data scientists within the data value tree can be notified that their recommendations were operationalized and the actual value is available.

Differences between actual and predicted value can trigger notifications based on thresholds or any other differences between what was predicted and what was observed.

Callouts can be made to data lake valuation metadata to suggest changes to the overall valuation.

Data value trees can be loaded and edited for other reasons as well (e.g., experimenting with different forms of valuation algorithms).

Data value tree catalogs can be queried to provide rich insight into not only the value of corporate data but also the accuracy and/or overall health of the company's analytic capabilities. For example:

What is the corporate delta between predicted and actual value?

Which tools are correlated with the most accuracy?

Which scientists generate the most accurate results?

Which tools tend to operate on the most valuable data sets?

Which scientists tend to operate on the most valuable data sets?

Which scientists have the most experience with a given tool?

Which scientists are associated with certain types of data sets?

Still further, the data value tree catalog can be an additional source of input as part of a larger valuation or data science framework. It can be queried and consulted in any number of use cases.

For example, if a streaming valuation model is being used, a certain data type can be recognized by the streaming algorithm, the data value tree catalog can be consulted, and relevant scientists can be notified that a new (and potentially high value) data set is streaming into the system.

In addition to the query capability described above, a set of tools can be used on the data value trees (e.g., dynamically while they are being created in a sandbox) or on the entire catalog itself.

It is to be appreciated that illustrative embodiments may include a graphical user interface (GUI) or some other form of interface such as, for example, a command line interface (CLI). The GUI can provide an administrator with the ability to select or create views of data value trees and/or data value tree catalogs. In an alternative embodiment, consider a command line tool where a data scientist manually dumps part of or all of the data value tree depicted in FIG. 2 using command: % Dump_Tree(my_sandbox_tree). Assume the command is to dump metadata from source node 1. The data may represent a status of all disk drives that are currently deployed and running in systems being shipped by a particular vendor. Dumping out of the entire data value tree can result in a textual description of every node and arc in the tree. The output below lists a subset of a data value tree that contains metadata such as descriptions, cardinality, current value, etc. The data may be presented as follows:

Source: Source Node 1
History Table
Provides history tracking for drives
and other parts in data center equipment
Schema Table={ . . . }
Upward Cardinality: [ ]
Value: 0

Figure 4:
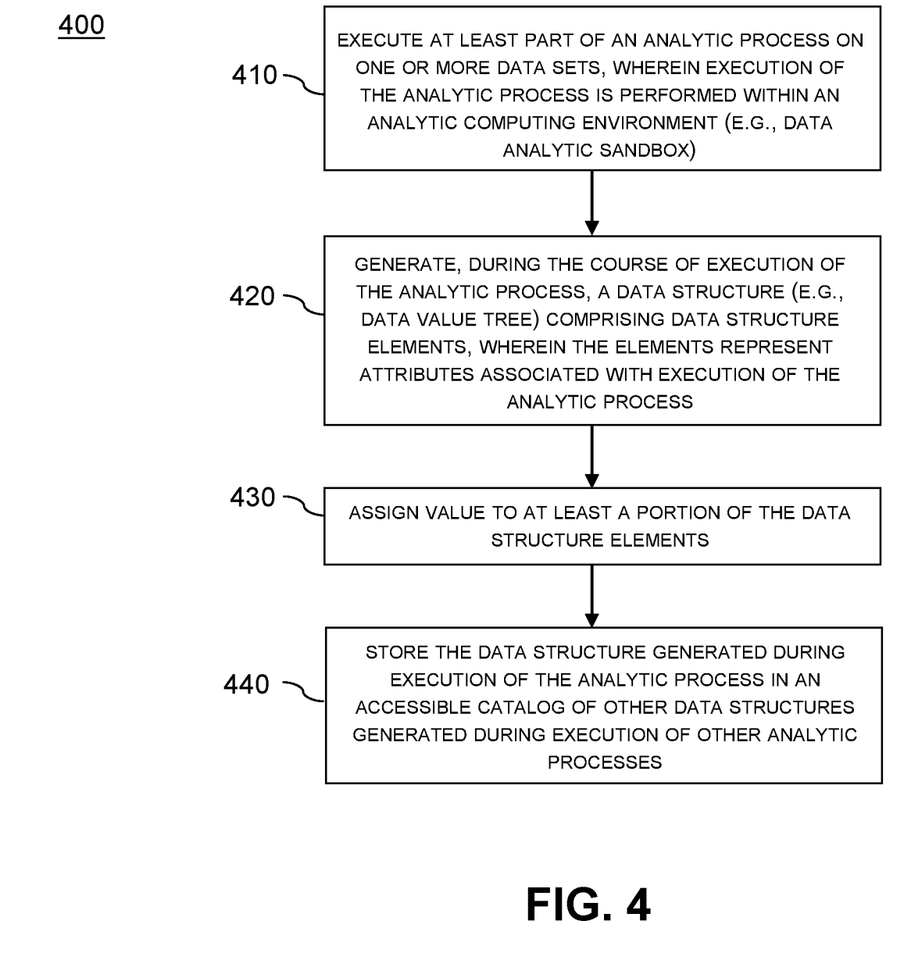
FIG. 4 illustrates a methodology for data value tree generation, according to an embodiment of the invention.

FIG. 4 illustrates a methodology 400 that summarizes steps for data value tree generation, according to an embodiment of the invention.

As shown, step 410 executes at least part of an analytic process on one or more data sets, wherein execution of the analytic process is performed within an analytic computing environment (e.g., data analytic sandbox).

Step 420 generates, during the course of execution of the analytic process, a data structure (e.g., data value tree) comprising data structure elements, wherein the elements represent attributes associated with execution of the analytic process.

Step 430 assigns value to at least a portion of the data structure elements.

Step 440 stores the data structure generated during execution of the analytic process in an accessible catalog of other data structures generated during execution of other analytic processes.

Figure 5:
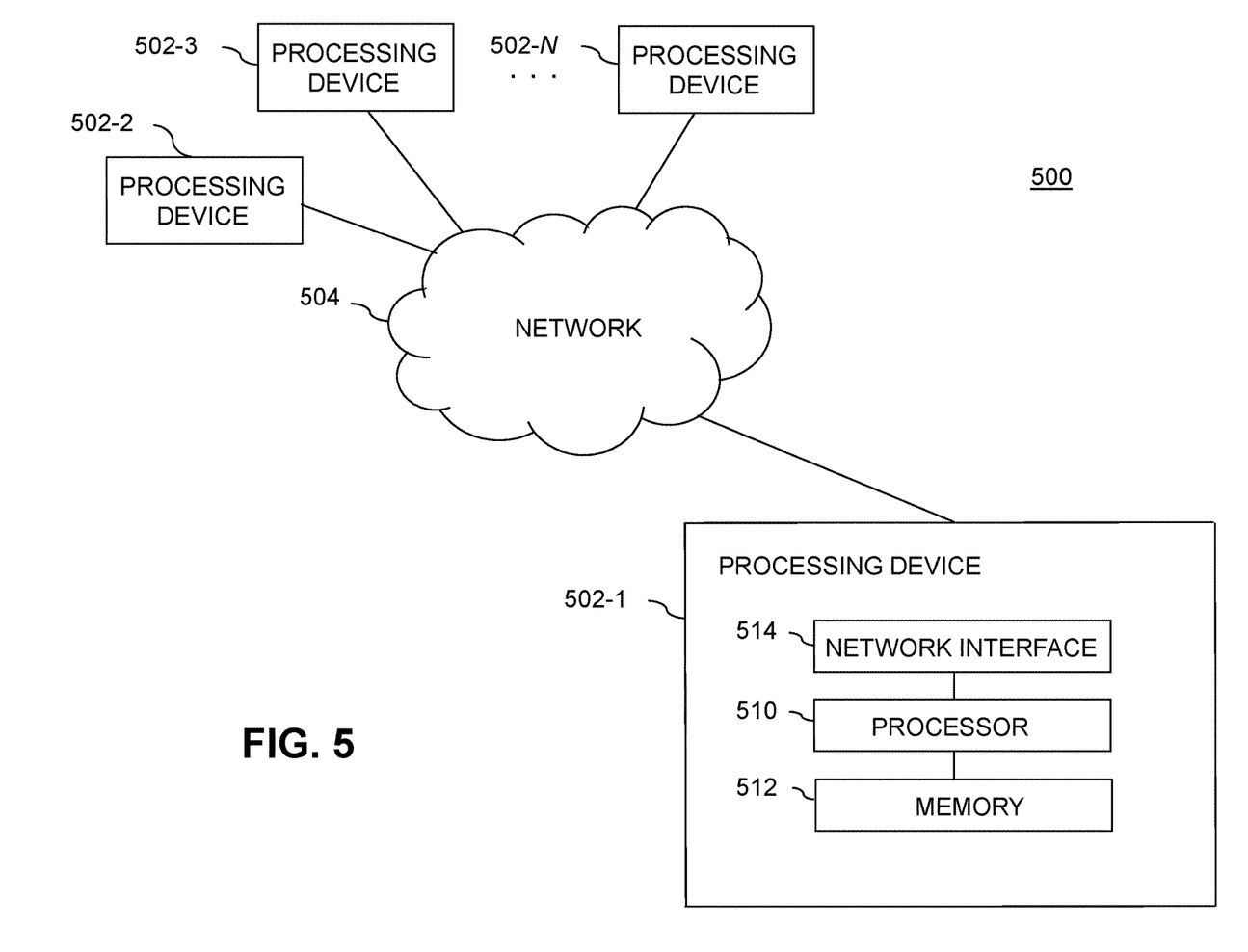
FIG. 5 illustrates a processing platform used to implement a data value tree generation and query engine and its corresponding environment, according to an embodiment of the invention.

As an example of a processing platform on which a data value tree generation and query engine and its corresponding environment (e.g., 100 in FIG. 1) according to illustrative embodiments can be implemented is processing platform 500 shown in FIG. 5. The processing platform 500 in this embodiment comprises a plurality of processing devices, denoted 502-1, 502-2, 502-3, . . . 502-N, which communicate with one another over a network 504. It is to be appreciated that the data value tree methodologies described herein may be executed in one such processing device 502, or executed in a distributed manner across two or more such processing devices 502. The cloud infrastructure environment may also be executed in a distributed manner across two or more such processing devices 502. The various functionalities described herein may be executed on the same processing devices, separate processing devices, or some combination of separate and the same (overlapping) processing devices. It is to be further appreciated that a server, a client device, a computing device or any other processing platform element may be viewed as an example of what is more generally referred to herein as a "processing device." As illustrated in FIG. 5, such a device generally comprises at least one processor and an associated memory, and implements one or more functional modules for instantiating and/or controlling features of systems and methodologies described herein. Multiple elements or modules may be implemented by a single processing device in a given embodiment.

The processing device 502-1 in the processing platform 500 comprises a processor 510 coupled to a memory 512.

The processor 510 may comprise a microprocessor, a microcontroller, an application-specific integrated circuit (ASIC), a field programmable gate array (FPGA) or other type of processing circuitry, as well as portions or combinations of such circuitry elements. Components of systems as disclosed herein can be implemented at least in part in the form of one or more software programs stored in memory and executed by a processor of a processing device such as processor 510. Memory 512 (or other storage device) having such program code embodied therein is an example of what is more generally referred to herein as a processor-readable storage medium. Articles of manufacture comprising such processor-readable storage media are considered embodiments of the invention. A given such article of manufacture may comprise, for example, a storage device such as a storage disk, a storage array or an integrated circuit containing memory. The term "article of manufacture" as used herein should be understood to exclude transitory, propagating signals.

Furthermore, memory 512 may comprise electronic memory such as random access memory (RAM), read-only memory (ROM) or other types of memory, in any combination. The one or more software programs when executed by a processing device such as the processing device 502-1 causes the device to perform functions associated with one or more of the components/steps of system/methodologies in FIGS. 1-4. One skilled in the art would be readily able to implement such software given the teachings provided herein. Other examples of processor-readable storage media embodying embodiments of the invention may include, for example, optical or magnetic disks.

Processing device 502-1 also includes network interface circuitry 514, which is used to interface the device with the network 504 and other system components. Such circuitry may comprise conventional transceivers of a type well known in the art.

The other processing devices 502 (502-2, 502-3, . . . 502-N) of the processing platform 500 are assumed to be configured in a manner similar to that shown for computing device 502-1 in the figure.

The processing platform 500 shown in FIG. 5 may comprise additional known components such as batch processing systems, parallel processing systems, physical machines, virtual machines, virtual switches, storage volumes, etc. Again, the particular processing platform shown in this figure is presented by way of example only, and the data valuation system and cloud infrastructure described herein may include additional or alternative processing platforms, as well as numerous distinct processing platforms in any combination.

Also, numerous other arrangements of servers, clients, computers, storage devices or other components are possible in processing platform 500. Such components can communicate with other elements of the processing platform 500 over any type of network, such as a wide area network (WAN), a local area network (LAN), a satellite network, a telephone or cable network, or various portions or combinations of these and other types of networks.

Furthermore, it is to be appreciated that the processing platform 500 of FIG. 5 can comprise virtual machines (VMs) implemented using a hypervisor. A hypervisor is an example of what is more generally referred to herein as "virtualization infrastructure." The hypervisor runs on physical infrastructure. As such, the techniques illustratively described herein can be provided in accordance with one or more cloud services. The cloud services thus run on respective ones of the virtual machines under the control of the hypervisor. Processing platform 500 may also include multiple hypervisors, each running on its own physical infrastructure. Portions of that physical infrastructure might be virtualized.

As is known, virtual machines are logical processing elements that may be instantiated on one or more physical processing elements (e.g., servers, computers, processing devices). That is, a "virtual machine" generally refers to a software implementation of a machine (i.e., a computer) that executes programs like a physical machine. Thus, different virtual machines can run different operating systems and multiple applications on the same physical computer.

Virtualization is implemented by the hypervisor which is directly inserted on top of the computer hardware in order to allocate hardware resources of the physical computer dynamically and transparently. The hypervisor affords the ability for multiple operating systems to run concurrently on a single physical computer and share hardware resources with each other.

An example of a commercially available hypervisor platform that may be used to implement portions of the processing platform 500 in one or more embodiments of the invention is the VMware vSphere (VMware Inc. of Palo Alto, Calif.) which may have an associated virtual infrastructure management system such as the VMware vCenter. The underlying physical infrastructure may comprise one or more distributed processing platforms that include storage products such as VNX and Symmetrix VMAX (both available from EMC Corporation of Hopkinton, Mass.). A variety of other computing and storage products may be utilized to implement the one or more cloud services that provide the functionality and features described herein.

It was noted above that portions of the data valuation system and cloud environment may be implemented using one or more processing platforms. A given such processing platform comprises at least one processing device comprising a processor coupled to a memory, and the processing device may be implemented at least in part utilizing one or more virtual machines, containers or other virtualization infrastructure. By way of example, such containers may be Docker containers or other types of containers.

It should again be emphasized that the above-described embodiments of the invention are presented for purposes of illustration only. Many variations may be made in the particular arrangements shown. For example, although described in the context of particular system and device configurations, the techniques are applicable to a wide variety of other types of data processing systems, processing devices and distributed virtual infrastructure arrangements. In addition, any simplifying assumptions made above in the course of describing the illustrative embodiments should also be viewed as exemplary rather than as requirements or limitations of the invention. Numerous other alternative embodiments within the scope of the appended claims will be readily apparent to those skilled in the art.

What is claimed is:
1. A method, comprising:
executing at least part of an analytic process on one or more data sets, wherein execution of the analytic process is performed within an analytic computing environment;
generating, during the course of execution of the analytic process, a data structure comprising data structure elements, wherein the data structure elements represent attributes associated with execution of the analytic process;

assigning value to at least a portion of the data structure elements;

updating a top level element of the data structure elements with an actual value yielded by the executing of the at least part of the analytic process; and recalculating, based at least in part on the actual value of the top level element an actual contributed value for at least some of the data structure elements that contributed to the top level element;

wherein the data structure elements comprise nodes and one or more connectors between the nodes, and wherein the top level element is a top level node to which at least some of the nodes and the one or more connectors contribute; and wherein the executing, generating, and assigning steps are implemented via at least one processing device comprising a processor and a memory.

2. The method of claim 1, wherein the data structure is a data tree comprising the nodes and the one or more connectors between the nodes.

3. The method of claim 2, wherein the nodes represent one or more data sets and the connectors represent transformations performed on the one or more data sets.

4. The method of claim 2, further comprising tracking the number of connectors emanating from a node, and using the number of emanating connectors to assign value to the node.

5. The method of claim 2, wherein at least one of the nodes in the data structure is an intermediate node representing an intermediate result associated with execution of the analytic process, and wherein at least one of the nodes is a bottom level source node connected to one of the intermediate node and the top level node by at least one connector.

6. The method of claim 2, wherein a given node in the data structure is connected via a connector to at least one other node which contributed to the creation of the given node.

7. The method of claim 2, wherein the value assigning step further comprises assigning value to one or more nodes and connectors as the analytic process is executed.

8. The method of claim 2, wherein one of the nodes of the data structure comprises an end node representing an end result of execution of the analytic process, wherein the end node is assigned a value representing a composite of values contributed by one or more of other nodes and connectors in the data structure.

9. The method of claim 8, wherein the end result of the end node comprises at least one recommendation.

10. The method of claim 1, further comprising associating metadata with at least one or more of the data structure elements, wherein the metadata relates to information about the attributes associated with the execution of the analytic process.

11. The method of claim 10, wherein the metadata for a data structure element comprises one or more of: an identifier of an analytic tool used to perform a transformation on a data set; a description of a transformation performed on a data set, and an identifier of an individual involved in a transformation of the data set.

12. The method of claim 1, wherein the step of assigning value to at least a portion of data structure elements further comprises dynamically assigning value such that contemporaneous valuation is performed as the data structure is generated.

13. The method of claim 1, further comprising storing the data structure generated during execution of the analytic process in an accessible catalog of other data structures generated during execution of other analytic processes.

14. The method of claim 13, further comprising receiving a query directed toward one or more of the data structures in the catalog.

15. The method of claim 14, wherein the query comprises a request for value assigned to one or more of the data structure elements to which the query is directed.

16. The method of claim 1, wherein the analytic computing environment comprises a data analytic sandbox.

17. The method of claim 1, wherein updating the top level element includes recalculating an actual contributed value for each of the data structure elements that contributed to the top level element.

18. An article of manufacture comprising a processor-readable storage medium having encoded therein executable code of one or more software programs, wherein the one or more software programs when executed by one or more processing devices implement the steps of:

executing at least part of an analytic process on one or more data sets, wherein execution of the analytic process is performed within an analytic computing environment;

generating, during the course of execution of the analytic process, a data structure comprising data structure elements, wherein the data structure elements represent attributes associated with execution of the analytic process;

assigning value to at least a portion of the data structure elements; and updating a top level element of the data structure elements with an actual value yielded by the executing of the at least part of the analytic process; and recalculating, based at least in part on the actual value of the top level element, an actual contributed value for at least some of the data structure elements that contributed to the top level element;

wherein the data structure elements comprise nodes and one or more connectors between the nodes, and wherein the top level element is a top level node to which at least some of the nodes and the one or more connectors contribute.

19. The article of manufacture of claim 18, wherein updating the top level element includes recalculating an actual contributed value for each of the data structure elements that contributed to the top level element.

20. A system comprising:

one or more processors operatively coupled to one or more memories configured to:

execute at least part of an analytic process on one or more data sets, wherein execution of the analytic process is performed within an analytic computing environment;

generate, during the course of execution of the analytic process, a data structure comprising data structure elements, wherein the data structure elements represent attributes associated with execution of the analytic process;

assign value to at least a portion of the data structure elements; and update a top level element of the data structure elements with an actual value yielded by the executing of the at least part of the analytic process; and recalculate, based at least in part on the actual value, an actual contributed value for at least some of the data structure elements that contributed to the top level element;

wherein the data structure elements comprise nodes and one or more connectors between the nodes, and wherein the top level element is a top level node to which at least some of the nodes and the one or more connectors contribute.

\* \* \* \* \*